(12) United States Patent
Davis et al.

(10) Patent No.: US 7,857,624 B2
(45) Date of Patent: Dec. 28, 2010

(54) CHILD TESTING APPARATUS, INFORMATION SYSTEM AND METHOD OF USE

(76) Inventors: Tina Marie Davis, 35 Pheasant La., Aliso Viejo, CA (US) 92656; Robert Duncan McDonald, 1446 Hampton Glen Ct., Decatur, GA (US) 30033

( * ) Notice: Subject to any disclaimer, the term of this patent is extended or adjusted under 35 U.S.C. 154(b) by 995 days.

(21) Appl. No.: 11/598,432

(22) Filed: Nov. 13, 2006

(65) Prior Publication Data

US 2008/0113319 A1 May 15, 2008

(51) Int. Cl.
*G09B 19/22* (2006.01)
*G09B 19/00* (2006.01)

(52) U.S. Cl. .................. 434/128; 434/136; 434/258; 434/259; 434/339; 446/1; 273/236; 273/238; 273/241; 273/156

(58) Field of Classification Search .............. 434/128, 434/136, 339, 259, 258; 273/236, 238, 241, 273/156; 446/1
See application file for complete search history.

(56) References Cited

U.S. PATENT DOCUMENTS

| 983,730 | A | | 2/1911 | Leach |
|---|---|---|---|---|
| 3,789,522 | A | | 2/1974 | Moore |
| 3,829,100 | A | | 8/1974 | Nielsen |
| 3,849,912 | A | | 11/1974 | Kemnitzer |
| 4,176,470 | A | | 12/1979 | Fosner et al. |
| 4,183,167 | A | | 1/1980 | Jatich |
| 4,385,762 | A | * | 5/1983 | Schwartz ............... 273/454 |
| 4,485,585 | A | | 12/1984 | Shackelford et al. |
| 4,541,806 | A | | 9/1985 | Zimmerman et al. |
| 4,609,356 | A | * | 9/1986 | Gilden et al. ............ 434/259 |
| 5,088,928 | A | | 2/1992 | Chan |
| 5,116,061 | A | | 5/1992 | Zentner, Jr. |
| 5,292,276 | A | * | 3/1994 | Manalo ................. 446/418 |
| 5,393,066 | A | | 2/1995 | Reinitz |
| 5,938,531 | A | | 8/1999 | Yasushi et al. |
| 6,196,544 | B1 | | 3/2001 | Rachofsky |
| 6,290,565 | B1 | * | 9/2001 | Galyean, III et al. ......... 446/99 |
| 6,595,780 | B2 | * | 7/2003 | Singh et al. ............... 434/258 |
| 6,626,676 | B2 | * | 9/2003 | Freer ...................... 434/236 |
| 6,666,453 | B2 | | 12/2003 | Chambers |
| 6,808,392 | B1 | * | 10/2004 | Walton .................... 434/236 |
| 7,214,066 | B2 | * | 5/2007 | Marcus et al. ............. 434/323 |
| 2004/0219495 | A1 | * | 11/2004 | Marcus et al. ............. 434/156 |
| 2009/0246742 | A1 | * | 10/2009 | Nadan et al. .............. 434/128 |

* cited by examiner

*Primary Examiner*—Xuan M Thai
*Assistant Examiner*—Kang Hu
(74) *Attorney, Agent, or Firm*—Gene Scott; Patent Law & Venture Group

(57) ABSTRACT

An apparatus for testing aspects of how a child learns includes a toy-like base having upstanding pegs. The child is encouraged to place donut shaped hand pieces onto the pegs. The hand pieces test the ability of the child to discriminate between different colors, and separately between different textures and different shapes and also tests the child's abilities in perception and creativity. The base also is able to test the child's ability to discern and copy tones and rhythms. Information of the child's performance is automatically collected within the apparatus and then compared with a normative baseline. Remediation focuses on activities related to the learning channels where the child is least astute and periodic retesting measures the ability of the child to improve in those channels to enable improvement of remediation approaches.

5 Claims, 4 Drawing Sheets

CHILD TESTING APPARATUS, INFORMATION SYSTEM AND METHOD OF USE

CROSS-REFERENCE TO RELATED APPLICATIONS

Not applicable.

STATEMENT REGARDING FEDERALLY SPONSORED RESEARCH OR DEVELOPMENT

Not applicable.

THE NAMES OF THE PARTIES TO A JOINT RESEARCH AGREEMENT

Not applicable.

INCORPORATION-BY-REFERENCE OF MATERIAL SUBMITTED ON A COMPACT DISC

Not applicable.

REFERENCE TO A "MICROFICHE APPENDIX"

Not applicable.

BACKGROUND OF THE INVENTION

1. Field of the Present Disclosure

This invention relates generally to devices and methods for developing age-appropriate learning skills using customized programs based upon assessments of the learning skills using toy-like testing devices.

2. Description of Related Art Including Information Disclosed Under 37 CFR 1.97 and 1.98

A number of adult studies dating back to the 1920's indicate that adults have several learning channels which may be considered discrete and relatively independent from each other. Sounds, letters, shapes, designs, rhythm, and non-associative memory are the most easily identifiable and have the longest history of being formally measured. Hearing and sight are two channels most commonly used by adults and that schools, and the business environment pay most attention to. Each of the channels involves a different portion of the brain and, for adults, they are relatively fixed. That is, if a particular channel of an adult is strong, meaning it is easy for him or her to learn, or another is relatively weak then this will not change over time, even with concerted effort. However, for any learning situation, the more channels a person uses, the easier learning will be and the more information will be retained. It is clearly an admirable objective to maximize the number of channels used and their strengths. In practice, most adults have one or two relatively strong channels and the rest are not nearly as strong. Stronger channels tend to be favored leading to positive reinforcement over a person's lifetime.

Parents tend to unconsciously reinforce their child's learning through the same channels that they favor. This may not coincide with the child's natural best channels. While educational toys for children are plentiful, none enable a parent to understand how their child learns in a truly comprehensive manner. Research and observation by the inventors of the present apparatus and method suggests that children between the ages of about three to four years may be at a uniquely flexible point in development. That is to say, that they may be able to increase the beneficial utilization of all of their learning channels.

Leach, U.S. Pat. No. 983,730, discloses a puzzle, comprising a base provided with a plurality of suitably distinguished upstanding posts, and a series of ring members arranged in sets of graduated size adapted to be mounted upon certain of the posts, there being a less number of sets of rings than the number of posts each set of rings bearing markings corresponding to the markings of one of the posts.

Moore, U.S. Pat. No. 3,789,522, discloses a an educational toy device which is a three dimensional unit for storage and includes a base with a plurality of hingedly connected panels at its outer edge adapted to be folded into the plans of the base with each of the panels defining a work station and having sockets to receive items of a predetermined geometrical shape sized to fit the respective sockets of the work stations and wall portions extending outwardly from the central portion of the base to separate the work stations from one another so that a plurality of youngsters may use the toy simultaneously, each working at a separate work station.

Nielsen, U.S. Pat. No. 3,829,100, discloses an educational puzzle in which there are a base member having a plurality of recesses therein, a corresponding number of pegs, each of a different color, and a corresponding number of blocks, each of the same color as one of said pegs. The blocks, when properly assembled, form a continuous layer of the same outline and size as the base member, so as to cover the base member. Preferably, the base member is circular and the pieces have largely arcuate edge walls. In assembly, the child places the pegs in the recesses in the base member and then places over each peg a block of the same color as the peg over which the block is placed, adjusting the angular position of the block until its fits snugly against the contiguous block or blocks.

Kemnitzer, U.S. Pat. No. 3,849,912, discloses an educational toy useful for teaching color mixing, shape identity, and the concept of sequency, utilizes an illuminated surface with protruding ordered dowels upon which a variety of playing pieces of different colors and geometrical shapes can be arranged so that the pieces overlap each other, providing visual color mixing, color matching, sequence, shape matching, and like activities to the user.

Fosner et al., U.S. Pat. No. 4,176,470, discloses an educational apparatus for automatically instructing a student to perform selected tasks, monitoring the student's action to determine if the tasks are performed in accordance with the instructions and providing audio, visual or physical reinforcement rewards upon the successful completion of the tasks is disclosed. The educational apparatus includes a carrel or booth having a horizontal work surface within which a plurality of holes are formed. In one embodiment, coded pegs having visual or tactile symbols located on one end and a machine readable code, peripherally located, near the other end are provided for insertion into the holes. In this embodiment sensing arrangements mounted in the peg holes read the machine readable code and control electrical signals in accordance therewith. The resultant information denotes the nature and orientation of inserted pegs. A CPU, programmed when peg insertion instructions are given, compares the peg orientation information with the program information. The comparison determines whether or not the peg insertion instructions have been followed. When all instructions have been correctly carried out, the CPU causes a designated reinforcement reward to be produced and the pegs to be ejected. In alternate embodiments, the holes are of different size or shape and objects are either inserted into the holes, or drop through the holes. In these embodiments the insertion or passage of the objects is sensed and the sensed information applied to the CPU for comparison with the program instructions. In all embodiments, failure to complete a selected number of tasks within a predetermined period of time causes an instructor alert indication to be produced.

Jatich, U.S. Pat. No. 4,183,167, discloses a three dimensional, educational and entertainment toy or game. The game includes a board having a plurality of rows of pegs of preferably hexagonal cross-section projecting from the top surface thereof and arranged with the pegs of alternate rows being offset from each other so that pegs in one row are disposed on a line halfway between those of the next adjacent row. Thus a line drawn from the midpoint of any three immediately adjacent pegs will form an equilateral triangle where two of the pegs lie in one row and the remaining peg lies on a line splitting the distance between the first two. The game also includes a plurality of geometrically shaped playing pieces taking various planar forms such as equilateral triangles, regular hexagonals, squares, circles etc. and being cast in varying colors so that an almost infinite variety of geometric and color configurations can be achieved when the pieces are assembled on the board. Each of the geometrically shaped playing pieces also includes a centrally located recess in its bottom surface and a centrally located projection in its top surface with the projections having cross-sectional configurations complemental to that of the pegs and being sized so as to fit easily into the recesses and with the recesses also being sized so as to fit easily over the pegs on the board.

Shackelford et al., U.S. Pat. No. 4,485,585, discloses a toy stacker assembly for pre-school children which inspires players to improve their skills in regard to size and color discrimination, hand-eye coordination and in other respects vital to proper childhood development. The toy is constituted by a multiple post ring stacker operating in conjunction with a series of cards each displaying a different pattern of rings of various colors and sizes stacked on the posts. The player is required to replicate the pattern of the selected card on display, the cards in the series presenting progressively more difficult patterns.

Schwartz, U.S. Pat. No. 4,385,762, discloses a present invention that relates to a game including a set of pieces having different outlines or otherwise differently configured whereby each is engagable into an individual location on a playing surface e.g. by insertion therein. A set of display elements each associated with one of the locations may be activated to indicate visibly when a piece is to be engaged with its associated location. A switch associated with each location is so arranged as to be operable when, and only when, the piece of the correct configuration is engaged in the location. An electrical operating circuit activates the display elements successively in an initial period and then activates only one display element. When the correct piece is engaged with the location corresponding to the activated display element the control circuit responds by deactivating the display element or by adjusting the sound from a sound source.

Zimmerman et al., U.S. Pat. No. 4,541,806, discloses a multiple aptitude testing device for electronically evaluating an examinee's capacity or aptitude toward performing various vocational tasks. The device includes a test station which affords five general types of examinations, namely, objective question and answer tests, a manual dexterity test, a finger dexterity test, a hand/eye coordination test, and a hand/eye/foot coordination test. The question and answer examinations entail interchangable overlays which contain questions and possible answers such that the examinee selects what he deems is the correct answer by contacting an appropriate sensor on the housing with an electrically conductive answer probe. The other four examinations entail counters for electronically measuring the number of times the examinee is able to perform a manipulative task during a fixed period of time. The device provides an electronic comparator for automatically grading the examinations and displaying or printing a test score associated with each of said tests. The device 20 is further designed to generally recognize which test is being conducted based on which of the various attachments or overlays are connected to the device. Although the test station is generally self-contained, e.g., not requiring separate answer booklets, writing utensils, etc., the preferred embodiment of the device entails using a separate master control unit which enables simultaneous, synchronized control of up to four test stations.

Gilden et al., U.S. Pat. No. 4,609,356, discloses an educational toy comprises a tray having a plurality of templates positioned thereon in a rearrangeable pattern. Each template has a hole there through of a unique shape. A corresponding plurality of mating male forms are provided. The toy is used by placing the forms into their mating templates. Upon placement of a form into its mating template, a magnet in the base of the form becomes positioned close enough to close a reed switch under the tray. Closure of the reed switch activates a timing circuit which activates a moving, sounding toy for a brief interval, thereby indicating to the child that he or she has made a correct placement. The templates can be easily rearranged in many patterns on the tray so that the child will not get bored with the game.

Chan, U.S. Pat. No. 5,088,928, discloses a method and apparatus for educational games comprising a plurality of printed cards/boards, and a novel low-cost touch pad with interface cable to the personal computer game-port. When an educational game is played, the player responds to computer questions/words/graphic object by pressing the corresponding answer in the printed card/board which is placed on top of the touch pad. This selection in terms of touched coordinates of the touch pad is sensed by the computer through the computer input/game port. Both computer generated sound and animation graphic pictures in terms of video games or others are used for either positive or negative feedback to the player. A variation of the same apparatus can be used for playing various computerized board games with a plurality of moving game pieces, and game boards by one or more players.

Zentner, Jr., U.S. Pat. No. 5,116,061, discloses a strategy game which has as structural base upon which a concentric pedestal is rotatably mounted permitting players to revolve for viewing. A number of equal spatial pins project upwardly around the periphery of the pedestal and each of the two players alternately place their own marked hollow beads over the pins. The pedestal is preferably round to allow a game to be played that has a playing field that is free from limiting boundaries, sidelines or barriers. The game is won when a player aligns four beads in a row either horizontal, diagonal or vertical. A storage bag with a drawstring encloses the pedestal beads and base for protection when not in use.

Chambers, U.S. Pat. No. 6,666,453, discloses a puzzle or game which is capable of multiple solutions. The puzzle pieces are all geometric shapes having only right angles. The puzzle pieces are assembled in a tray, which optionally includes a storage area.

Manalo, U.S. Pat. No. 5,292,276, discloses a new and improved early childhood learning toy that includes a housing portion which includes planar walls, wherein at least two of the planar walls include different colors, and wherein at least two of the planar walls includes different visible patterns. The planar walls define an interior chamber. One of the planar walls includes one aperture permitting communication between the interior chamber and outside the housing portion. One of the planar walls includes two apertures permitting communication between the interior chamber and outside the housing portion. A plurality of cords includes respective ends attached to opposite ends of a planar wall. The cords extend across the planar wall, and a plurality of solid geometrical shapes are supported by the cords such that the geometrical shapes can be selectively moved along the cords. The respective geometrical shapes include respective centrally located cord-receiving apertures for receiving the cords. The cords are made of elastic material. A tether is connected to a planar wall, and a ball is connected to the tether. The tether and the ball are made from elastic material. A stick holder assembly is attached to a planar wall, and a pair of drumsticks are capable of being retained in the stick holder assembly. An array of chimes may be attached to a planar wall. A quantity of a hook or loop material may be attached to a planar wall.

Reinitz, U.S. Pat. No. 5,393,066, discloses a board game having a game board with a generally planar upper surface and a plurality of pegs protruding generally perpendicular therefrom. The pegs are arranged in a closed geometric pattern, preferably a circle, with adjacent pegs spaced equidistant from one another. The game board is utilized in conjunction with a plurality of game pieces having a pair of generally planar opposing surfaces with a first hole and a second hole extending therethrough. The spacing between the first hole and the second hole is approximately equal to the spacing between adjacent pegs so that the game pieces can be slidably received over any pair of adjacent pegs. The game pieces further include a first and a second means for indicating value, wherein the first means for indicating value is located proximate the first hole and the second means is located proximate the second hole. One of the opposing surfaces of each game piece is preferably subdivided into a first half and a second half with a hole and means for indicating value associated with each half. A method for utilizing the game board and game pieces is further disclosed.

Yasushi et al., U.S. Pat. No. 5,938,531, discloses an information reproducing apparatus applied to a psychological game machine which can evaluate the deep mental state of human, avoiding monotonous progress of a game. A plurality of image and audio information have previously been stored on a recording medium such that at least one of the plurality of image and audio information stored on the recording medium is selected for reproduction based on external operations and physiological changes in the body.

Rachofsky, U.S. Pat. No. 6,196,544, discloses a puzzle that includes a set of three-dimensional puzzle pieces having at least two different indicia applied on the external surfaces to define a pattern of continuous stripes. The puzzle pieces can have the shape of a Z-polycube formed from four unit cubes. The external shape and size of each puzzle piece in the set is identical, however, the indicia are applied in a different pattern on each puzzle piece in the set. The puzzle pieces in the set are juxtaposable to form a secondary object having a second external shape such that the indicia visible on the external surface of secondary object defines a pattern of continuous stripes. A plurality of secondary puzzle modules can be juxtaposed to form a tertiary object wherein the surface indicia visible on the external surface of tertiary object still form a pattern of continuous stripes. When the pieces and puzzle modules of the puzzle are correctly juxtaposed, the structure forms a sculpture with a desirable appearance.

Nelson, EU 0403130, discloses a physical exercise apparatus comprising target members to be actuated by a player switch means associated with the target members such that activation of the target members causes a change in the status of the switch means, signal means selectively responsive to the status of the switch means, and control means for selectively causing the signal means to change between a first condition and a second condition.

Mees, WO 9622139, discloses a device for keeping score notating and/or recording the course of a board game, in particular a game of chess, which game is played on board comprising squares which are characterized by combinations of letters and/or numerals, during which game moves are made, whereby pieces are placed on a square. The device is provided with storage means for storing the successive moves of a game, with a keyboard comprising specific keys for inputting the successive moves of the game in question, and with output means for transferring the recording of the course of the game.

Okuda, JP11169555, discloses a solution to miniaturize and simplify a game device by constituting it of a game result printer and a small computer constituted by collapsibly integrating a game player photographing camera, the image signal processing part and an image display part. An operation part of a collapsibly integrated small computer and a display such as a liquid crystal panel are arranged in a casing. The display is fixed to an intermediate shelf of the casing by a fixing tool. A small camera using a CCD element, a half mirror and a game result printing printer are arranged. The camera photographs a game player in front of the casing through a transparent member and the half mirror to be displayed on the display by making an image and the left-right of the game player coincide with each other by performing left-right converting processing by the computer operation part. This is converted into an image to be printed/outputted by the printer together with a game result. Thus, a game device can be miniaturized/simplified.

Joisu, JP 2001113037, discloses a solution to provide a mah-jongg board capable of being used for entering play identification information and capable of being utilized for reckoning game fees and fees for food and drink. This mah-jongg board frame body is provided with input devices for identifying individual players and printers as required. A card reader for a magnetic card, a punch card, or a contact or non-contact type card is used as the player identification input device, or another digital switch can be utilized. When the digital switch is utilized, each game player enters an identification code. The player identification input devices are connected to a mah-jongg score counting device. If writable cards are used, scores of the players are sent to the player identification input devices from the mah-jongg score counting device and recorded on the cards when a game is finished. If the printers are provided, the scores of the players are sent to the printers form the mah-jongg score counting device and printed out when the game is finished.

The related art described above discloses a wide variety and types of learning games and apparatuses for children. However, the prior art fails to disclose an apparatus and method of use that isolates testing of a child within each of a number of learning channels. The present disclosure distinguishes over the prior art providing heretofore unknown advantages as described in the following summary.

BRIEF SUMMARY OF THE INVENTION

This disclosure teaches certain benefits in construction and use which give rise to the objectives described below.

Given consistent findings in published adult studies, the inventors started with the hypothesis that, if learning channels could be measured in preschool children, the results would also show that a child between the ages of two and six years old would show differences in the relative strengths of their learning channels. If this could be demonstrated, it was additionally hypothesized, that because neural development is not complete in this age group, it might be possible to create conditions under which a relatively weak learning channel could be improved. The literature suggests that young children learn from color, shape, texture, sounds, rhythms, two dimensional designs, and three dimensional shapes. In addition, children also learn by observation and their experiences. Our literature search failed to identify a single study that shows how to deal with separate learning channels so as to measure channel strength in children under five.

A program providing assessment and customized targeting of learning channels provides parents an opportunity to broaden their children's channels, and as such, gives a competitive advantage for the child to be better prepared for an increasingly overloaded and demanding educational environment. One embodiment of the invention provides a method for parents to interact with their children to better understand how their child learns. To the child, a toy used by the parent and designed for assessing isolated learning channels may be perceived as playing a game. During this "play" activity the data representing responses by the child to the game situation are captured electronically and recorded on a memory chip. After the game is finished, in one embodiment, the parent provides the collected data to a secure interactive web-based portal and receives detailed information on each learning channel. This service includes recommended feedback on how to improve and build on the learning channel development of the child. In other embodiments, feedback may be produced through non-web-based software or built into the toy device itself.

The problem with existing commercial learning toys is that they use more than one learning channel simultaneously making it impossible to gain an objective measure of what is observed. The inventors therefore designed several toys that would isolate learning channels. Starting with a simple stacking toy, different sets of disks were designed for each of three learning channels: color, shape and texture. In addition, the inventors designed several games that would isolate tonal, rhythm, 2-dimensional and 3-dimensional learning. The inventors arranged for subjects for a preliminary study of learning channels. About 65 preschool children, age 3-5, took part in the study. Parents were not told anything about the study or its purpose except that it was about development in children. A standard procedure and process was developed that allowed the consistent observation of learning channels with each child. The following results were found:

1. Individual children showed differences in how easily and well they accomplished tasks that isolated individual learning channels. For instance, a child might easily accomplish a task that focused on color, but have great difficulty accomplishing a task that focused on sound.

2. It was possible to score each child's responses on each task in an objective and replicable way, using a simple 1-5 scale. The scale represents years of age for the child. Thus, the scales were created in such a way that the normal development of a 3 year old would result in a score of 3 on a task. If a child of 3 scores 1 on a task, then this means that it is a relatively weak learning channel for that child. Likewise, if a child of 3 scores a 4 or 5 on a task, this means that it is a relatively strong learning channel for that child. Using these scores, it was possible to create a learning profile for each child observed.

3. In certain cases, it was possible, after one or two unsuccessful trials with a learning task, to point the child's attention to a critical aspect of the toy. With some, although not all, of the children with whom this was attempted, the child showed marked improvement on the learning channel task A child of 4 might go from scoring consistent '1' on a task to a consistent '4,' for instance. We were not able to perform repeat testing on the children for these trials, but a subject for future research will be whether this kind of improvement stays with the child. The fact that this marked improvement was observed at all in any of the children is in stark contrast to what would be expected in similar testing with adults.

Isolation of Learning Channels

The first task in measuring the relative strength of learning channels is to isolate the different learning channels. The procedure for isolating the learning channels in children age 3-5 preferably takes into account the child's presumed level of familiarity with different types of tasks. For example, one cannot presume that children this age can read or are familiar with letters. We therefore want to use a basic task that will be familiar to children of this age and that most children of this age group can physically perform. We chose a basic task that almost all preschool children of almost all cultures are in some way familiar with: stacking toys. The normal stacking toy consists of one or more pegs fixed to a base, with several pieces designed to fit onto the pegs so that the pieces can be easily stacked and held in place for an interval of time. Stacking toys are designed for children to sort the pieces—typically according to color, size or shape, and their are more imaginative toys designed for the children to sort other dimensions as well. Typically, a stacking toy employs several learning channels at the same time, e.g., color and shape and size—in order to increase the likelihood that the child will see one of these channels and sort according to it. The present invention is configured to isolate learning channels. The toy employs multiple sets of disks to stack and sort on multiple pegs. In one specific embodiment, the toy employs three sets of disks and five pegs. Other embodiments, employ variants on this, and some embodiments have a sound-generating chip to observe the tonal and rhythm learning channels. The three sets of disks are designed so that the only way to sort them will be to use one, and only one learning channel. One set of disks sorts by color, a second by shape, and a third by texture. The tonal and rhythm chip may be designed to produce a tone or a set of tones in a rhythmic sequence. The child will match the tone or match the rhythmic sequence.

Process of Observation

In one embodiment, to use the toy, the parent lays out the disks and stacking pegs for a particular learning channel—color, for instance. Saying as little as possible about the task, the parent will ask, "Where do the disks go?" He or she will let the child put the disks on the pegs wherever the child wants to put them. The toy is made with a tracking device that identifies each disk and records on which peg and in what position the child puts each disk When the child is finished, the parent will lay out the pieces again and ask the same question: "Where do the disks go?" The child will again work with the pieces. If the child is close to being able to do the task, but still has not been able to fully assemble the pieces, the parent may lay out the pieces again and again letting the child put the pieces on the pegs. If the child is not close to being able to do the task the parent may end the observation with the second trial. The parent may make observations for color, texture and shape with the appropriate sets of disks. The parent may then make observations for tone and rhythm using the sound chip. This may be automated so that the parent will press a button to start the trial and the child will press one of several buttons in order to match the tone. In the same way, the parent may press another button in order to produce a rhythm. The child will imitate the rhythm, using a key in the toy. In one embodiment, once the parent has orchestrated two or three trials for each of the learning channels, he or she may upload the data generated by the trials to a website.

Using a set of algorithms acting on the test data, a set of descriptions of the different learning channels for the child are produced. The parent is therefore informed as to the strongest and weakest channels. In some embodiments, the parent may be able to download some suggestions for play and observation for the individual child. The parent may be able to use these suggestions for play with the child in order to strengthen weak learning channels and to help the child integrate all of the learning channels in play. In other embodiments, the parent's observations may be entered into non-web-based software on a computer or even entered into the toy itself which then produces the individualized results. Ideally, the parent should observe the child with the toy about every three months from about the child's third birthday until he or she turns five. Other frequencies and age ranges may be used, depending upon the individual child's developmental status. The underlying logic of the website may keep track of the data for each child. This data will be used to track the progress of each child as he or she grows older. This data may be used to update the database on which the results for each child are based and which the algorithms use to pull descriptions and suggestions for the parent. In addition, it is anticipated that this data will be used to write studies on children's learning channels for scientific publication. The website or software may also be used or programmed to aggregate the results of two or more children to report group results. One particular embodiment of the invention comprises a toy and instructions that are designed to make the mostly invisible process of learning in children highly visible and obvious to the parent. This particular age is a time of very rapid cognitive development, and children change very quickly throughout these two years.

A primary objective inherent in the above described apparatus and method of use is to provide advantages not taught by the prior art.

Another objective is to provide a physical apparatus capable of testing a child's learning ability in discrete learning channels.

A further objective is to provide an information system capable of measuring the child's performance in each of the channels against a standardized scale.

A further objective is to utilize such measurements to assist in determining steps for improving learning skills in weak channels.

A further objective is to provide a method for testing learning skills in children.

A further objective is to provide such a method capable of isolating the testing of learning skills according to well known channels.

Other features and advantages of the present invention will become apparent from the following more detailed description, taken in conjunction with the accompanying drawings, which illustrate, by way of example, the principles of the presently described apparatus and method of its use.

BRIEF DESCRIPTION OF THE SEVERAL VIEWS OF THE DRAWING(S)

Illustrated in the accompanying drawing(s) is at least one of the best mode embodiments of the present invention In such drawing(s):

DETAILED DESCRIPTION OF THE INVENTION

The above described drawing figures illustrate the described apparatus and its method of use in at least one of its preferred, best mode embodiment, which is further defined in detail in the following description. Those having ordinary skill in the art may be able to make alterations and modifications to what is described herein without departing from its spirit and scope. Therefore, it must be understood that what is illustrated is set forth only for the purposes of example and that it should not be taken as a limitation in the scope of the present apparatus and method of use.

Figure 1:
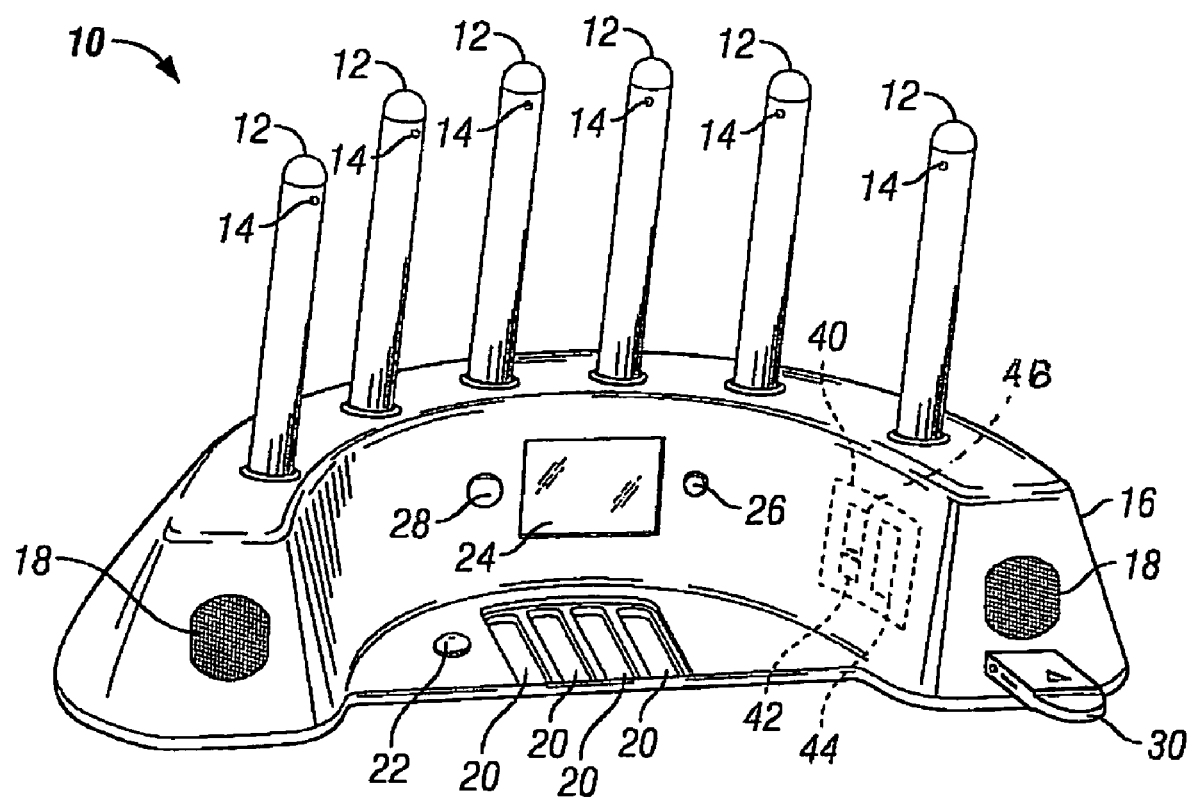
FIG. 1 is a perspective view of a base of the presently described invention.

The present invention is a learning system apparatus providing a base 10, preferably an enclosure with an interior compartment or space as is well known in the art for most electrical equipment and electronic devices and for children's learning toys, as shown in FIG. 1. A plurality of receivers 12 are secured to the base 10 and each of the receivers 12 provides a proximity sensor 14 having a unique sensor identity. In the preferred embodiment shown in FIG. 1, the receivers 12 are upright pegs. However, the receivers 12 may be any one or more of a large number of possible mechanical receiving devices, as for instance the receivers might be apertures that can accept the insertion of objects. The proximity sensors 14 are preferably optical scanners, but may also be magnetic, RFID, or other types of sensory instrumentation, and they are placed so as to detect when an object of a certain type is engaged with the receivers.

Figure 2:
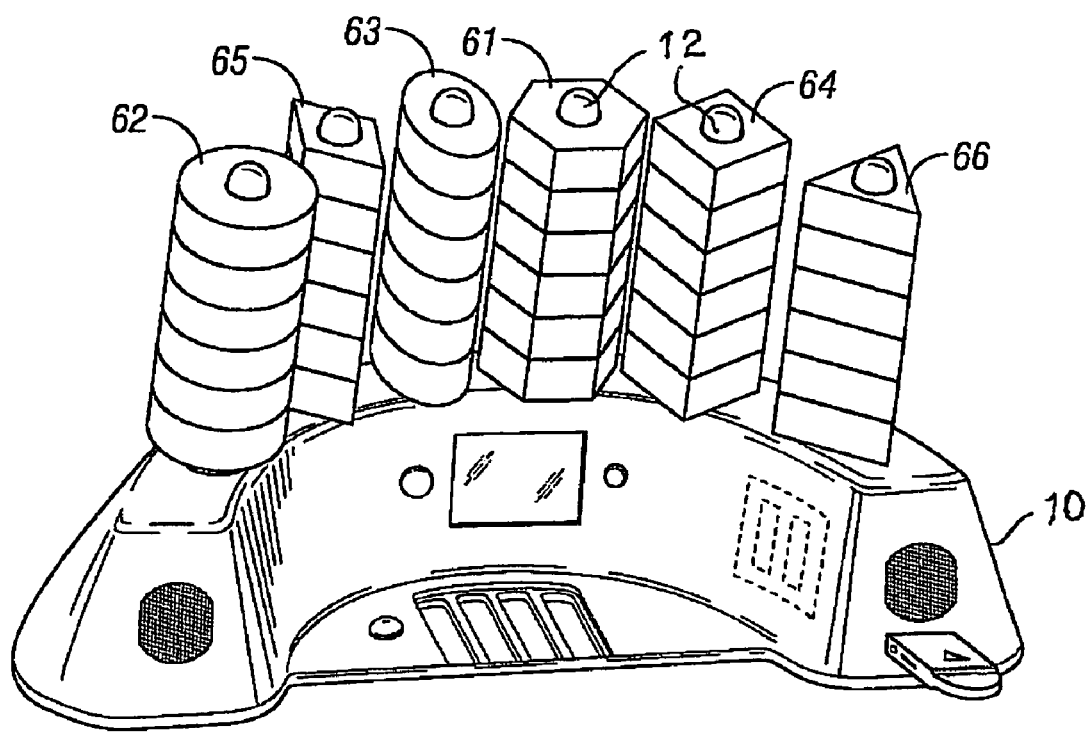
FIG. 2 is a perspective view thereof showing stacked hand pieces engaged with upright pegs of the base.
Figure 3:
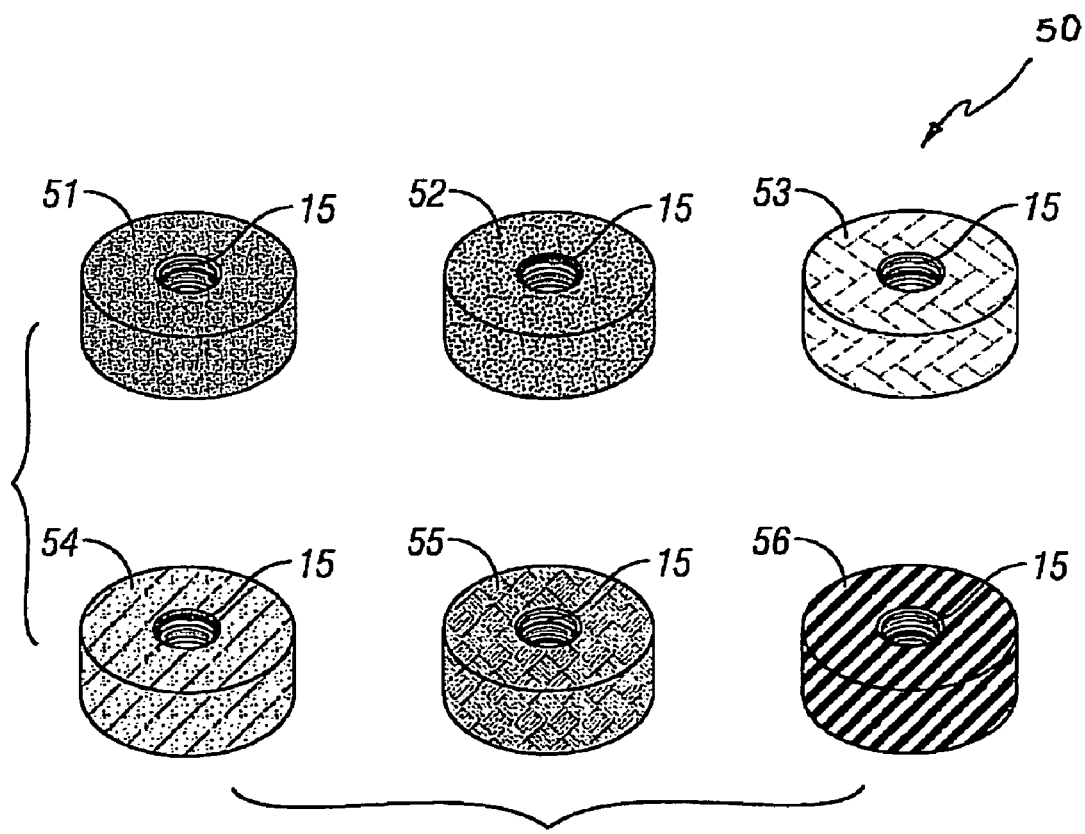
FIG. 3 is a perspective view thereof of one configuration of the hand pieces distinguished by their surface texture for tactile discrimination or by their color for visual discrimination.
Figure 4:
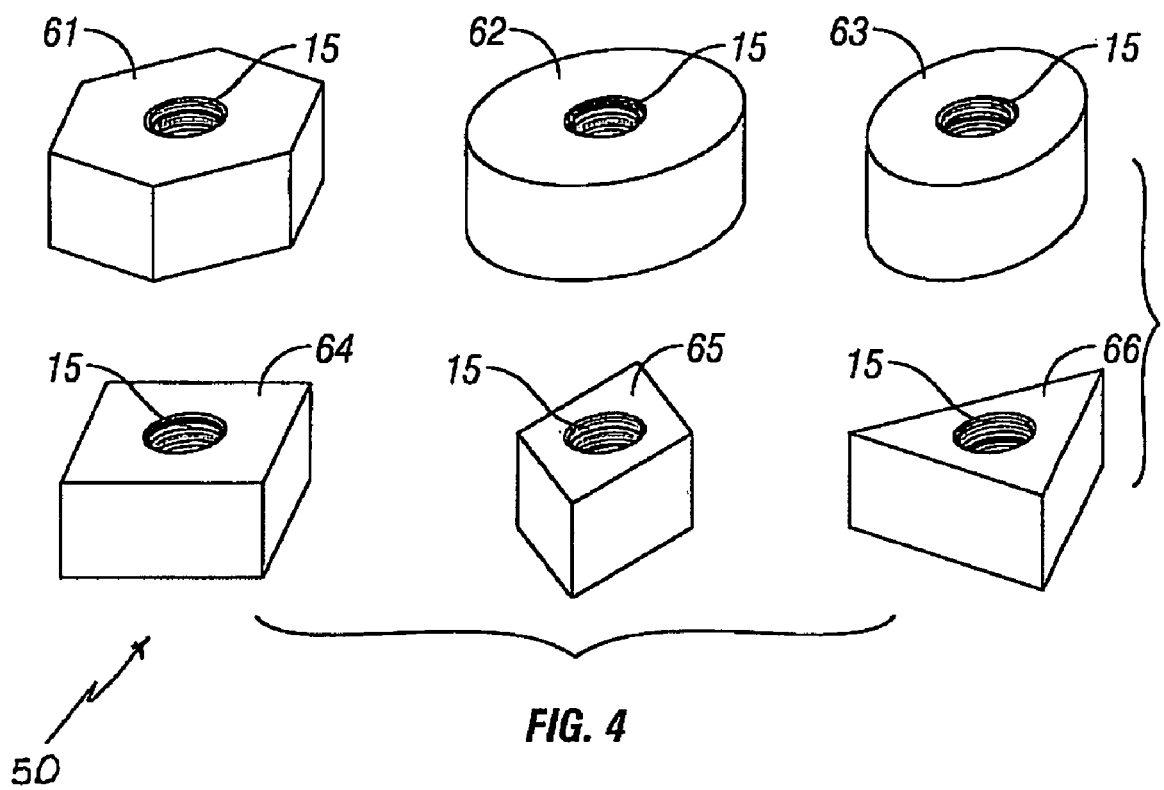
FIG. 4 is a perspective view thereof of another configuration of the hand pieces distinguished by their shape for visual discrimination.

A plurality of mutually distinguishable hand pieces, referred to generally by numeral 50 in the attached drawing figures, and individually by numerals 51-56 (FIG. 3) and 61-66 (FIGS. 2 and 4), each possess a unique hand piece identity feature 15 capable of being sensed by any one of the proximity sensors 14 when a hand piece 50 is engaged with a receiver 12. As shown in FIGS. 3 and 4, the hand pieces 50 are preferably donut shaped blocks with central holes that engage the receivers 12 when the hand pieces 50 are placed onto the receivers 12. The identity feature 15 may be a bar code printed on the inside surface of the central hole of each of the hand pieces 50 as shown in FIGS. 3 and 4, and, of course, each bar code is different so as to provide a unique identity to each hand piece 50. In an alternate embodiment, the proximity sensor 14 may be a magnetic switch closing in two opposing directions depending on the presence of a permanent magnet north or south pole. When each of the hand pieces 50 comprises three ring magnets with facial poles, the number of arrangements is two to the third power so that eight arrangements are possible, and this would suffice for a receiver 12 that will accept up to eight hand pieces 50. In this case, as for instance, a particular hand piece 50 might produce the sequence of: N-S, S-N,N-S when placed onto the receiver 12. The interior of the receivers 12 is preferably hollow so that a sensor 14 is easily mounted within each. The sensors, too, are easily adapted, as known in the art, to identify itself within an electrical circuit so that the identity of each hand piece 50 onto each specific receiver 12 is known during use of the apparatus.

An information processor 42 such as a CPU, functions in a circuit 40 held within the base 10, as shown in FIG. 1. The circuit 40 also includes a memory device 44 such as a solid state digital memory, in communication with the processor 42. The sensors 14, processor 42 and memory device 44 are mutually engaged as a data processing system, a part of circuit 40, which further includes a power source and support components as would be well known to those of skill in the art, and which is enabled for storing data defining relations between the hand pieces 50 and the receivers 12. In the present case, which hand pieces 50 are placed onto the receivers 12 and in which order is determined by the present apparatus. If hand pieces 50 are removed and/or replaced onto the same or different receivers 12 these actions are also sensed and stored in the memory device 44. In summary then, we have an apparatus that is able to automatically record the actions of a child in using the apparatus.

The hand pieces 50 are organized in sets. For instance FIG. 3 represents a set of six different hand pieces 51-56 wherein each of the hand pieces has a different color. Also hand pieces 51-56 represents hand pieces that each have a different surface texture but common color. FIG. 4 shows that a further variant is shape, as illustrated by hand pieces 61-66 having a hexagonal 61, round 62, oval 63, square 64, diamond 65 and triangular 66 shapes. Clearly, other shapes may be used instead of those shown. As shown in FIG. 2, six of each of the shaped hand pieces 50 comprise a full set. Clearly, a full set may include less or more than six of each shape, and likewise for color and texture. There does not appear to be a compelling reason why a full set for different channels might not have different numbers of variants and different quantities of hand pieces 50. The full set, in the present invention includes six identical hand pieces of each of the six different colors, textures and shapes, so that each full set has a total of 36 pieces for a grand total of 108 hand pieces 50.

Figure 6:
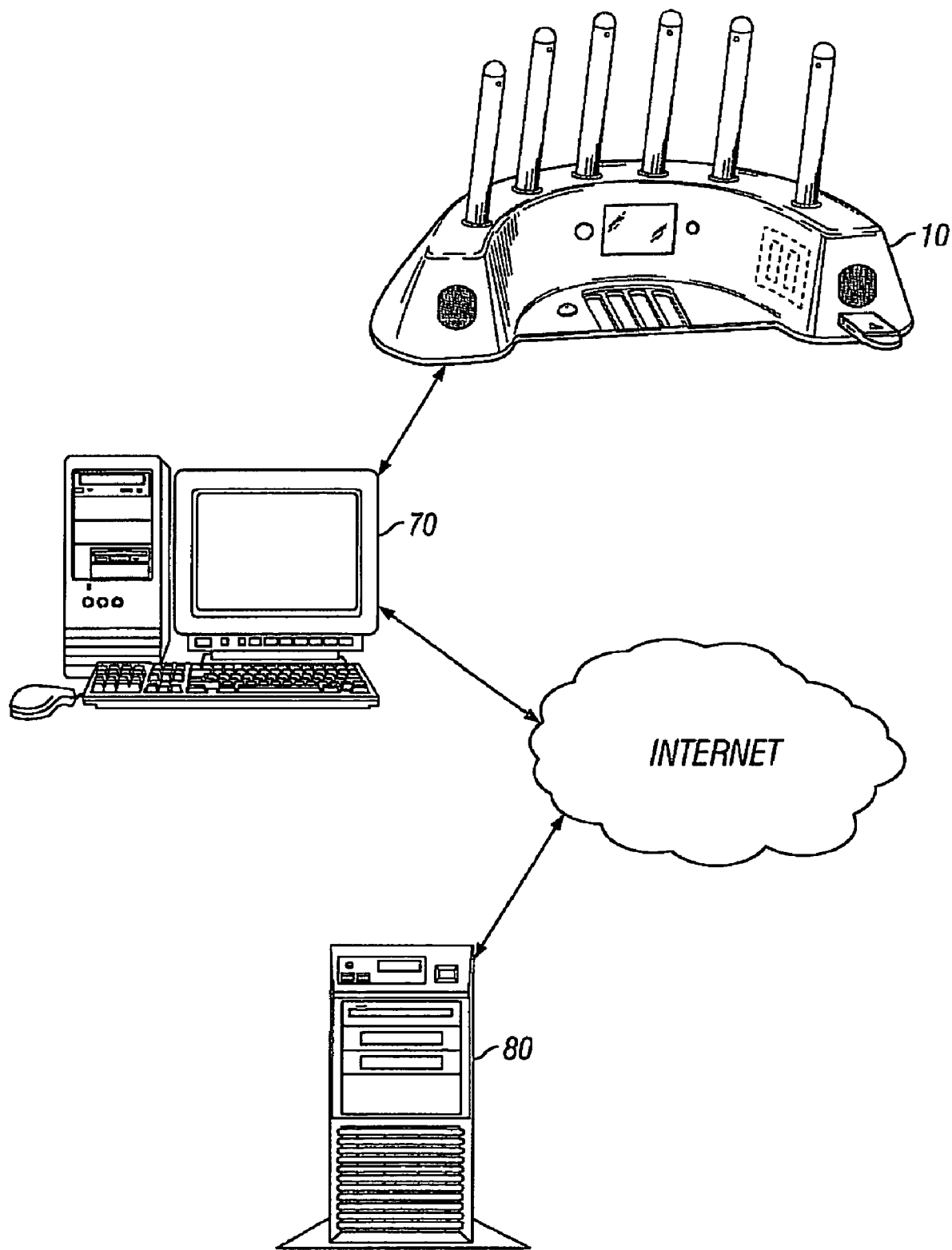
FIG. 6 is an information system configuration schematic showing information flow between several information processors of the present invention.

The circuit 40 preferably further includes a tone generator 46 with input touch sensors 20 for generating a novel tone upon receiving a touch. In FIG. 1 are shown four individual sensors 20 so that four distinct tones may be produced and heard from loud speakers 18. Clearly, more than four such sensors 20 may be used for a greater number of tones. Switch 22 is also part of the circuit 40 and it is enabled for generating a first tone, one of the four tones related to sensors 20. When placed in an alternate mode, the same sensors 20 and switch 22 function to produce a monotone rhythm, such as tone, tone, tone, space, tone, tone, or tone, space, tone, tone, space, tone. The use of these tones and rhythms will be described presently. Finally, the circuit 40 includes a display device 24 such as an LCD screen, a mode leaning channel switch 28 for moving from one learning channel to another, and a go/no-go lamp 26. This lamp 26 provides green illumination for go or continue testing, and red illumination for stop testing. An algorithm is programmed to determine when results of a test in a currently tested channel is sufficient or insufficient to make a determination of the child's current ability. Testing will continue until fixed sufficiency parameters are met or until a selected number of repeated testing cycles have been completed. A data communicator such as a removable solid state memory 30 may be inserted into a port in the base 10, the port preferably a USB type or similar connector socket. Other means for transferring data from the memory device 44 of circuit 40 to a remote computer may be used instead of a USB port. Alternatives include data transfer by wire or cable, and wireless using Bluetooth technology or radio frequency or infrared signals, all of which are common and well known signaling methods for the transfer of data from one unit to another unit in a data processing system, or information system. In each case, the objective is to move the data collected in the memory device 44 to a local computer 70 (FIG. 6), and further, or alternatively, to a remote server 80. It should be clear that control and monitoring function controls such as elements 22, 24, 26 and 28 on base 10, may preferably be placed on the rear of the base 10 so as to be more or less excluded from the child, or may be incorporated in a hand held remote unit manipulated by the parent.

The above described apparatus is used in a novel method for identifying learning channel preferences and proficiencies of a child. The method includes the step of producing a learning channel specific stimulus having selective variability comprehensible to the child. The specific stimulus in the present invention is one of color, shape, surface texture, tone and rhythm. A stated above, these five stimuli represent five distinct and separate channels used by the child in learning. Each is tested independently so that the hand pieces of differing color do not have different shapes. The hand pieces of differing shapes and textures all have the same color. Each stimulus is provided in isolation to the others.

A response by the child to each stimulus is facilitated either by coaching or by demonstrating. For a child that has never been exposed to a pin and donut game, a demonstration may be necessary for the child to understand the basic mechanical hand-eye coordination principles involved in placing a donut onto a pin. Once a child understands this, he/she is left to figure out that there are more satisfactory and more pleasing arrangements of the hand pieces on the pins than others. Ideally, the child will determine that all of the hand pieces 50 of one type may be placed onto a single receiver 12 and we can conclude that the child then has discovered the idea of commonality and segregation according to such. This is an advanced and important stage in the learning process and child maturation.

The hand piece placements for each learning channel are automatically detected and this data is stored as a data set. In testing for tone the parent presses button 22 and the child tries to identify the tone by touching one of the sensors 20. If the child fails, the test is repeated with parent pressing button 22 and child selecting one of the sensors 20. In this test, the value of the repetition variable may be of interest. In testing for rhythm, the parent again presses button 22 and the child repeatedly touches any one of sensors 20 to try to replicate the rhythm. In this case, the tone remains constant. Again, the repetition variable (how many tries needed to succeed) may be the variable of interest. In any case, the data is automatically collected as in the case of the placement of the hand pieces 50.

The entire data set is compared with normalized distributions of data taken using identical procedures from a population of children of the same age group as the tested child. This comparison may be accomplished by a remote server 80 managed by a trained staff or by a local computer 70 using a standardized algorithm operating on the normalized distribution which may be located remotely with communication over the Internet or other WAN, or located within the local computer 70. Finally, the entire comparative analysis may be accomplished within the base 10 itself. It is clear that the collection of test data and its analysis with respect to expected results is so well known as to not require specific explanation here.

Variances between normalized performance and that of the child are determined to form score values defining a proficiency of the child within each of the learning channels. The same procedure is used for each of the learning channels.

Figure 5:
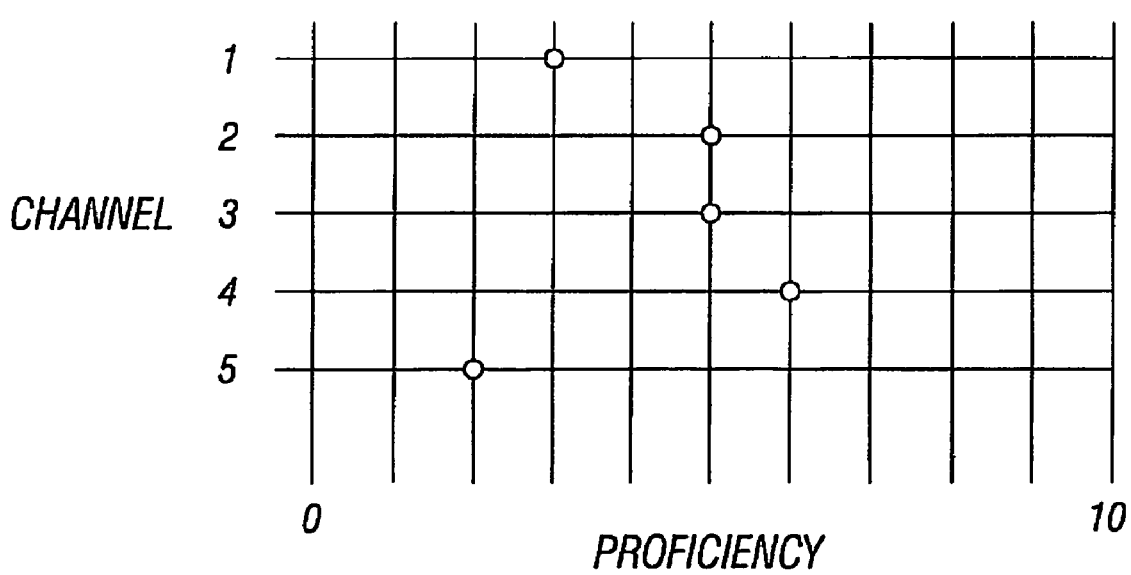
FIG. 5 is a proficiency chart showing results of testing within several learning channels provided by the apparatus while using the method of the present invention.

A responsive report quantitatively defining the learning channel preferences and proficiencies of the child and recommended remediation are provided to the child's parent or guardian. FIG. 5 is a chart that indicates the proficiency of a child in each of the five channels discussed. On a proficiency scale of 1 to 10 with 5 representing a normalized mean, the scores of the child are shown by small circles. In this case, we see scores of: 1-3, 2-5, 3-5, 4-6, and 5-2; wherein the first numeral represents the channel number and the second numeral represents the score on the 10 scale. Such a scale may represent standard deviations from the mean, or any other method of grading.

The full set of five channel tests are preferably repeated periodically; and the recommended remediation is adjusted in accordance with changes in the learning channel preferences and proficiencies for the child.

Our research has shown that the preferred channels for children between the ages of 36 months and 59 months are shape, color, texture, tone, and rhythm. However, other channels may be included within the human senses responsive to visual, tactile, audible, olfactory; and taste stimuli.

Additional learning channels may be utilized for young children and others for slightly older children. Clearly, the materials used for testing and the types of thinking required by the child will differ according to age, but the principles of the present invention apply broadly to all classes of subjects, i.e., the techniques of observation and measurement of activities within isolated channels are similar to those described above.

Examples of further applications of the present principles are:

Three dimensional—learning using three dimensional channel—see and remember structures having characteristics in three spatial dimensions.

Two dimensional—learning using two dimensional channel—see and remember structures having characteristics primarily in two spatial dimensions.

Experiential—complex learning channel—learning new things by doing a task or performing a function.

Observational—complex learning channel—learning new things by observing another person doing a task or performing a function.

The basic ideas of observing and measuring using the above four learning channels will be the same as previously described, i.e., isolate each channel in a simple task that can be observed and measured. Preliminary research indicates that we can in fact measure these channels and that they are significant. Our current thinking is that they are probably most significant for children a little older than the current population we are dealing with—probably 4-6 year olds.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A learning system apparatus comprising:
   a) a base having an interior compartment;
   b) a plurality of upright peg receivers secured to the base, each of the receivers providing a proximity sensor having a unique sensor identity;
   c) a plurality of mutually distinguishable hand pieces, each of the hand pieces having an aperture therethrough of such size as to receive any one of the upright peg receivers thereby securing the hand piece on the upright peg receiver, and each of said hand pieces further providing a unique hand piece identity feature within said aperture, said identity feature capable of being sensed by any one of the proximity sensors when the hand piece is engaged with the respective receiver;
   d) an information processor within the compartment; and
   e) a memory device within the compartment;
   the sensors, processor and memory device mutually engaged as a data processing circuit, enabled for storing a data defining relations between the hand pieces and the receivers.

2. The apparatus of claim 1 wherein the circuit further comprises a tone generator and a touch sensor, the tone generator enabled for generating a first tone upon receiving a touch on the touch sensor, followed by a second tone upon receiving a further touch on the touch sensor; the apparatus enabled for storing relationship data respective of the first and second tones.

3. The apparatus of claim 1 wherein the circuit further comprises a tone generator and a touch sensor, the tone generator enabled for generating a first tone rhythm upon receiving a touch on the touch sensor, followed by a second tone rhythm upon receiving a further touch on the touch sensor, the apparatus enabled for storing relationship data respective of the first and second tone rhythms.

4. The apparatus of claim 1 wherein the proximity sensor is a bar code reader, and the hand piece identity feature is a bar code indicia.

5. A method for identifying learning channel preferences and proficiencies of a child, the method comprising the steps, for each of the learning channels, of:
   a) providing a plurality of mutually distinguishable hand pieces wherein each said hand piece has an aperture therein and within said apeture a unique hand piece identity feature; and further providing a test station having mutually distinguishable upright peg receivers capable of engaging the apertures of the hand pieces;
   b) facilitating the placement of the hand pieces on the receivers of the test station by the child;
   c) detecting the identity feature of each of the hand pieces by proximity sensors of the receivers as the hand pieced are engaged with the receivers;
   d) forming a data set corresponding to the positions of the hand pieces the data set including hand piece identity on each of said receivers, and hand piece order on each one of the receivers;
   e) evaluating the data set to establish a level of proficiency of the child separately in each of the learning channels; and
   f) defining remediation for improving the level of proficiency of the child in the learning channels.

\* \* \* \* \*